United States Patent
Liu

(10) Patent No.: US 10,820,369 B2
(45) Date of Patent: Oct. 27, 2020

(54) WIRELESS CONNECTION ESTABLISHING METHODS AND WIRELESS CONNECTION ESTABLISHING APPARATUSES

(71) Applicant: Beijing Zhigu Rui Tuo Tech Co., Ltd, Beijing (CN)

(72) Inventor: Jia Liu, Beijing (CN)

(73) Assignee: Beijing Zhigu Rui Tuo Tech Co., Ltd, Beijing (CN)

(\*) Notice: Subject to any disclaimer, the term of this patent is extended or adjusted under 35 U.S.C. 154(b) by 102 days.

(21) Appl. No.: 15/326,445

(22) PCT Filed: Jun. 5, 2015

(86) PCT No.: PCT/CN2015/080856
§ 371 (c)(1),
(2) Date: Jan. 13, 2017

(87) PCT Pub. No.: WO2016/008344
PCT Pub. Date: Jan. 21, 2016

(65) Prior Publication Data
US 2017/0208630 A1    Jul. 20, 2017

(30) Foreign Application Priority Data

Jul. 18, 2014 (CN) .......................... 2014 1 0344876

(51) Int. Cl.
*H04W 76/40* (2018.01)
*H04W 76/10* (2018.01)
(Continued)

(52) U.S. Cl.
CPC .......... *H04W 76/40* (2018.02); *H04B 17/318* (2015.01); *H04W 12/06* (2013.01);
(Continued)

(58) Field of Classification Search
CPC ..... H04W 76/40; H04W 76/19; H04W 76/14; H04W 76/11; H04W 76/10; H04W 12/06; H04W 28/22; H04W 8/005; H04B 17/318
(Continued)

(56) References Cited

U.S. PATENT DOCUMENTS 8,018,834 B2 * 9/2011 Mantysalo .......... H04M 1/6058
370/210
8,249,504 B2 8/2012 Fujii
(Continued)

FOREIGN PATENT DOCUMENTS

CN    1777133 A    5/2006
CN    1805392 A    7/2006
(Continued)

OTHER PUBLICATIONS

Chinese Office Action dated Sep. 29, 2017 for Chinese Patent Application No. 201410344876.8, 19 pages (with translation).
(Continued)

*Primary Examiner* — Christopher R Crompton
(74) *Attorney, Agent, or Firm* — Amin, Turocy & Watson, LLP

(57) ABSTRACT

Embodiments of this application provide for establishment of a wireless connection. A method comprises: generating connection authentication information according to related information of a wired connection between a first device and a second device; and sending, in case of disconnection of, a wireless connection establishing request in such a manner that the request can be received by the second device, where the request comprises the connection authentication information. In the methods and apparatuses of embodiments of this application, by using related information of a wired connection as authentication information of establishing a wireless connection, the wireless connection can be estab-
(Continued)

lished rapidly and securely, and/or device power consumption can also be considered.

27 Claims, 5 Drawing Sheets

(51) Int. Cl.
*H04W 76/19* (2018.01)
*H04W 12/06* (2009.01)
*H04B 17/318* (2015.01)
*H04W 76/14* (2018.01)
*H04W 76/11* (2018.01)
*H04W 28/22* (2009.01)
*H04W 8/00* (2009.01)

(52) U.S. Cl.
CPC ....... *H04W 12/0602* (2019.01); *H04W 28/22* (2013.01); *H04W 76/10* (2018.02); *H04W 76/11* (2018.02); *H04W 76/14* (2018.02); *H04W 76/19* (2018.02); *H04W 8/005* (2013.01)

(58) Field of Classification Search
USPC .......................................................... 370/329
See application file for complete search history.

(56) References Cited

U.S. PATENT DOCUMENTS

| | | | |
|---|---|---|---|
| 8,630,592 B2 | 1/2014 | Rajamani et al. | |
| 8,908,580 B2 | 12/2014 | Shen | |
| 8,957,765 B2 | 2/2015 | Guo et al. | |
| 9,369,558 B2 | 6/2016 | Zakarias et al. | |
| 2006/0111097 A1* | 5/2006 | Fujii | H04W 12/003 455/420 |
| 2007/0036358 A1* | 2/2007 | Nguyen | H04L 41/0806 380/270 |
| 2008/0058972 A1* | 3/2008 | Yoneda | G10L 19/173 700/94 |
| 2008/0198870 A1* | 8/2008 | Brodersen | H04L 12/5692 370/465 |
| 2011/0019228 A1 | 1/2011 | Uchikawa | |
| 2011/0182172 A1* | 7/2011 | Kulkarni | H04W 48/17 370/221 |
| 2012/0264444 A1* | 10/2012 | Yu | H04W 48/18 455/450 |
| 2014/0335803 A1* | 11/2014 | Rivera | H04B 1/38 455/90.3 |
| 2015/0103006 A1* | 4/2015 | Hemes | H04W 76/10 345/163 |
| 2015/0133053 A1* | 5/2015 | Li | H04W 76/10 455/41.2 |
| 2015/0220476 A1* | 8/2015 | Kojima | G06F 21/83 710/106 |

FOREIGN PATENT DOCUMENTS

| | | |
|---|---|---|
| CN | 101212241 A | 7/2008 |
| CN | 102348209 A | 2/2012 |
| CN | 102385792 A | 3/2012 |
| CN | 102396271 A | 3/2012 |
| CN | 101668322 B | 6/2012 |
| CN | 102612030 A | 7/2012 |
| CN | 101964856 B | 7/2013 |
| CN | 102143536 B | 11/2013 |
| CN | 103533141 A | 1/2014 |
| CN | 104080086 A | 10/2014 |
| WO | 2004070970 A1 | 8/2004 |
| WO | 2008082939 A1 | 7/2008 |

OTHER PUBLICATIONS

International Search Report for PCT Application No. PCT/CN2015/080856, dated Sep. 10, 2015, 3 pages.

* cited by examiner

WIRELESS CONNECTION ESTABLISHING METHODS AND WIRELESS CONNECTION ESTABLISHING APPARATUSES

RELATED APPLICATION

The present application is a U.S. National Stage filing under 35 U.S.C. § 371 of international patent cooperation treaty (PCT) application No. PCT/CN2015/080856, filed Jun. 5, 2015, and entitled "WIRELESS CONNECTION ESTABLISHING METHODS AND WIRELESS CONNECTION ESTABLISHING APPARATUSES", which claims the benefit of priority to Chinese Patent Application No. 201410344876.8 filed with the Chinese Patent Office on Jul. 18, 2014 which applications are hereby incorporated herein by reference in their respective entireties.

TECHNICAL FIELD

This application relates to the technical field of direct communication between devices, and in particular, to wireless connection establishing methods and wireless connection establishing apparatuses.

BACKGROUND

Generally, there are two ways of communication between devices: communication in a wired way through a wired connection such as USB or Ethernet, and communication in a wireless way through a wireless connection such as WiFi or Bluetooth. The wired way is usually used to transmit a large quantity of data since small interference and large bandwidth, etc; while the wireless way is also widely used since high mobility and wide coverage, etc. During communication between devices through the wired connection, a wired connection may be disconnected because of some reasons, and in this case, in order to ensure that the communication is performed, the wired connection may be switched to the wireless connection. A scenario of switching between a wired connection and a wireless connection has such problem that: there may be multiple wireless devices available for connection around. Therefore, a solution which can rapidly determine an object with which to establish a wireless connection is desirable.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

An example, non-limiting objective of this application is to provide a wireless connection establishing method and a wireless connection establishing apparatus.

In a first example aspect of this application, a wireless connection establishing method is provided, where the method comprises:
  generating connection authentication information according to related information of a wired connection between a first device and a second device; and
  sending, in case of disconnection of the wired connection, a wireless connection establishing request in such a manner that the request can be received by the second device, wherein the request comprises the connection authentication information.

In a second example aspect of this application, a wireless connection establishing method is provided, where the method comprises:
  receiving a wireless connection establishing request of a first device;
  verifying, in response to that the request comprises connection authentication information, legality of the first device according to related information of a historical wired connection between the first device and a second device; and
  sending a response to the wireless connection establishing request to the first device that is authenticated, where the connection authentication information comprises the related information of the historical wired connection between the first device and the second device.

In a third example aspect of this application, a wireless connection establishing apparatus is provided, where the apparatus comprises:
  a generating module, configured to generate connection authentication information according to related information of a wired connection between a first device and a second device; and
  a sending module, configured to send, in case of disconnection of the wired connection, a wireless connection establishing request in such a manner that the request can be received by the second device, wherein the request comprises the connection authentication information.

In a fourth example aspect of this application, a wireless connection establishing apparatus is provided, where the apparatus comprises:
  a receiving module, configured to receive a wireless connection establishing request of a first device;
  an authentication module, configured to verify, in response to that the request comprises connection authentication information, legality of the first device according to related information of a historical wired connection between the first device and a second device; and
  a responding module, configured to send a response to the wireless connection establishing request to the first device that is authenticated, where the connection authentication information comprises the related information of the historical wired connection between the first device and the second device.

In a fifth example aspect of this application, a computer readable storage device is provided, comprising at least one executable instruction, which, in response to execution, causes a system comprising a processor to perform operations, comprising:
  generating connection authentication information according to related information of a wired connection between a first device and a second device; and
  sending, in case of disconnection of the wired connection, a wireless connection establishing request in such a manner that the request can be received by the second device, wherein the request comprises the connection authentication information.

In a sixth example aspect of this application, a device for wireless connection establishing is provided, comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:

generating connection authentication information according to related information of a wired connection between a first device and a second device; and sending, in case of disconnection of the wired connection, a wireless connection establishing request in such a manner that the request can be received by the second device, wherein the request comprises the connection authentication information.

In a seventh example aspect of this application, a computer readable storage device is provided, which, in response to execution, causes a system comprising a processor to perform operations, comprising:

receiving a wireless connection establishing request of a first device;

verifying, in response to that the request comprises connection authentication information, legality of the first device according to related information of a historical wired connection between the first device and a second device; and sending a response to the wireless connection establishing request to the first device that is authenticated, wherein the connection authentication information comprises the related information of the historical wired connection between the first device and the second device.

In an eighth example aspect of this application, a device for wireless connection establishing is provided, comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:

receiving a wireless connection establishing request of a first device;

verifying, in response to that the request comprises connection authentication information, legality of the first device according to related information of a historical wired connection between the first device and a second device; and sending a response to the wireless connection establishing request to the first device that is authenticated, wherein the connection authentication information comprises the related information of the historical wired connection between the first device and the second device.

In the methods and apparatuses of example embodiments of this application, by using related information of a wired connection as authentication information of establishing a wireless connection, the wireless connection can be established rapidly and securely, and/or device power consumption can also be considered.

DETAILED DESCRIPTION

The detailed description of this application is further described in detail hereinafter in connection with accompanying drawings (in several accompanying drawings, same numerals denote same elements) and embodiments. The following embodiments are used to describe this application, but not used to limit the scope of this application.

It can be understood by a person skilled in the art that the terms such as "first" and "second" in this application are only used to differentiate different steps, devices or modules, and the terms neither represent any specific technical meaning, nor represent an inevitable logic sequence between the steps, the devices, or the modules.

Figure 1:
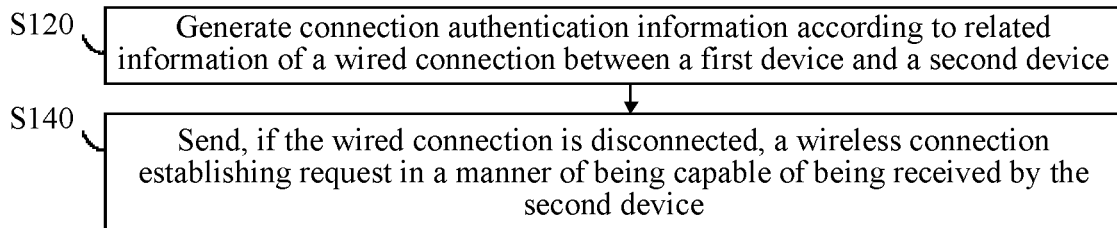
FIG. 1 is an example flowchart of a wireless connection establishing method according to a first embodiment of this application.

As shown in FIG. 1, a wireless connection establishing method according to a first embodiment of this application comprises:

S120. Generate connection authentication information according to related information of a wired connection between a first device and a second device.

In each embodiment of this application, a first device and a second device are any devices that can perform direct communication between the two through a wired or wireless connection, such as, terminal devices (mobile phones, computers, earphones, or displays), network access devices (routers, switches, or repeaters), or wireless energy transmission devices. The communication may refer to a communication with a single input/output party, such as, a charging process or an audio/video signal output process, and may further refer to an interaction communication process, such as, data packet transmission. In each embodiment of this application, the first device and the second device are only used to distinguish roles of each device in a wireless connection establishing process.

The related information of the wired connection may be any information involved in a process of communicating through a wired connection, for example, may comprise at least one of the following: identification information of the first device and the second device, a data transmission rate/amount in a preset time point/period, related information of transmitted data (comprising a data type, a data size, and a file name), and a disconnection time of the wired connection.

S140. Send, in case of disconnection of the wired connection, a wireless connection establishing request in such a manner that the request can be received by the second device, where the request comprises the connection authentication information.

In the method according to this embodiment, the connection authentication information is used to verify legality of one device (the first device) requesting to establish a wireless connection, and in order to ensure connection security, the connection authentication information may be used to serve as a ciphertext in the connection establishing request to be sent in an encryption form, or the connection authentication information directly serves as a key for encrypting some or all content of the request.

In the method according to this embodiment, the connection authentication information is information that only the two devices in the wired connection can know, and therefore, the wireless connection can be established securely and rapidly by using such connection authentication information.

In an example embodiment, in order not to increase device burden, in S120, the connection authentication information may be generated in response to the disconnection of the wired connection.

Generally, after the wired connection is disconnected, both of the two devices in the wired connection will play a role in establishing a wireless connection, that is, after the wired connection is disconnected, each device plays a role of a broadcast party (one party initiating the wireless connection) to broadcast a message that the device may establish the wireless connection, and waits for the wireless connection establishing request; meanwhile or optionally, each device also plays a role of scanning party (one party allowing to be wirelessly connected) at any time to scan the broadcast message of the other device, so as to search for the other device which may establish the wireless connection with the device. In the method according to this embodiment, in order to avoid connection delay caused by randomly determining roles of devices in a wireless connection establishing process and save device energy consumption, before the generating connection authentication information in S120, the method may further comprise:

S110. Determine, according to a transmission characteristic of the wired connection, a role of the first device in the process of establishing the wireless connection.

The transmission characteristic of the wired connection may comprise: a signal sending party during communicating through the wired connection, a signal receiving party during communicating through the wired connection, a signal sending party and a signal receiving party during communicating through the wired connection, or, a signal transmission direction before the wired connection is disconnected.

For example, in a process of charging through a wired connection, a power supply party is a signal sending party, and a charged device is a signal receiving party.

In a process of performing audio/video playback through a wired connection, a device providing an audio/video source is a signal sending party, and an audio/video output device such as an earphone/display is a signal receiving party.

In a process of performing data packet exchange through a wired connection, at a moment before the wired connection is disconnected, a terminal device sends an access request to an AP, and a data packet transmission direction is from the terminal device to the AP.

Any party in the wired connection mentioned above could be determined as the initiator to establish the wireless connection in the method according to this embodiment. Correspondingly, in step S140, the wireless connection establishing request may be sent, that is, steps S120 and S140 may be performed, only if the wired connection is disconnected and the role of the first device is the initiator (broadcast party). If the role of the first device is a waiting party (scanning party), a method described in a next embodiment will be performed.

Moreover, in order to implement the method of the embodiment of this application, the first device and the second device may have agree on a connection authentication way, and the connection authentication way comprises: which related information of the wired connection is used as connection authentication information, an encryption manner of the connection authentication information, and the like. For example, the two parties have agree on that, a data transmission amount in five minutes before the disconnection of the wired connection is used as connection authentication information, or time for which the wired connection is disconnected is used as connection authentication information, or time of the wired connection is used as a key for encrypting identification information of the initiator, or the like. Correspondingly, the method of this embodiment further comprises:

S100. Determine a connection authentication way of establishing a wireless connection between the first device and the second device.

Since characteristics of the wired connection such as small interference, large bandwidth, and high privacy security, the determining a connection authentication way in step S100 may be performed during the communication between the first device and the second device through the wired connection.

Furthermore, in the sending a wireless connection establishing request in such a manner that the request can be received by the second device in step S120, preferably, the wireless connection establishing request is sent in a broadcast way. Moreover, transmit power of the broadcast may be determined according to a communications protocol based on which the communication through the wired connection is. For example, if the wired connection is a connection through a USB, and the length of a USB cable cannot exceed 5 m based on standards, and therefore it may be determined that a possible distance between the first device and the second device does not exceed 5 m, in order to save device power consumption, and reduce the quantity of irrelevant devices receiving a broadcast packet, the first device may broadcast the wireless connection authentication information at a transmit power which can be received by a device within a range of 5 m.

After the connection authentication information is sent, the second device may receive the connection authentication information and be capable of verify legality of the first device according to the authentication way agreed on establishing a wireless connection with the first device by returning a response. Correspondingly, the method of this embodiment further comprises:

S160. Receive a response of the second device to the wireless connection establishing request, thereby completing establishment of the wireless connection with the second between devices.

To sum up, in the method according to this embodiment, by using related information of a wired connection as authentication information of establishing a wireless connection, the wireless connection can be established rapidly and securely, and device power consumption can also be considered.

Figure 2:
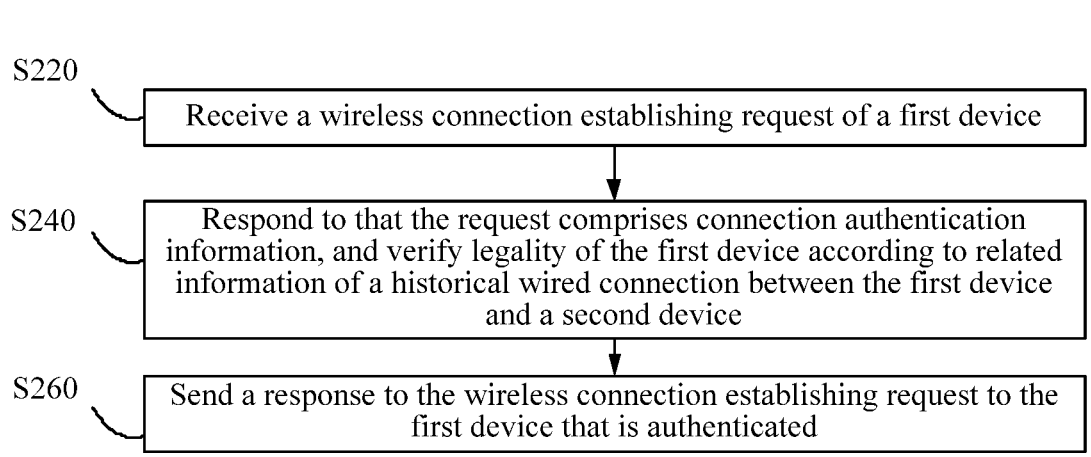
FIG. 2 is an example flowchart of a wireless connection establishing method according to a second embodiment of this application.

The method of the foregoing embodiment is mainly run at the initiator establishing the wireless connection, and for the other party establishing the wireless connection, that is, equivalent to the second device in the foregoing embodiment, this application also correspondingly provides a wireless connection establishing method of another embodiment, so as to be performed. As shown in FIG. 2, the method comprises:

S220. Receive a wireless connection establishing request of a first device.

A second device serving as the other party establishing a wireless connection waits to receive the wireless connection establishing request from the first device after a wired connection between the second device and the first device is disconnected.

S240. Verify, in response to that the request comprises connection authentication information, legality of the first device according to related information of a historical wired connection between the first device and a second device.

During waiting for wireless connection establishing request, the second device may receive a connection request sent by more than one requesting party. In response to that the request comprises the connection authentication information used in the method according to this application, legality of the requesting party is verified based on related information of a historical wired connection of the requesting party.

S260. Send a response to the wireless connection establishing request to the first device that is authenticated, thereby establishing a wireless connection between the second device and the legal first device.

The connection authentication information comprises the related information of the historical wired connection between the first device and the second device. The related information of the wired connection may be any information involved in a process of communicating in a wired connection manner, such as, may comprise at least one of the following: identification information of the first device and the second device, a data transmission amount in a preset time point/period, related information of transmitted data (comprising a data type, a data size, and a file name), and a disconnection time of the wired connection. To ensure communication security, the connection authentication information may be encrypted in any encryption manner.

To sum up, in the method of this embodiment, the connection authentication information is information that only the two devices in the wired connection can know, and therefore, the wireless connection can be established securely and rapidly by using such connection authentication information.

Moreover, in order to implement the method of the embodiment of this application, the first device and the second device may agree on a connection authentication manner, and the connection authentication manner comprises: which related information of the wired connection is used as connection authentication information, an encryption manner of the connection authentication information, and the like. For example, the two parties agree on that, a data transmission amount in five minutes before the disconnection of the wired connection is used as connection authentication information, or time for which the wired connection is disconnected is used as connection authentication information, or time of the wired connection is used as a key for encrypting identification information of the initiator, or the like. Correspondingly, the method according to this embodiment further comprises:

S210. Determine a connection authentication way of establishing a wireless connection between the first device and the second device.

Since characteristics of the wired connection such as small interference, large bandwidth, and high privacy security, the determining a connection authentication way in step S210 may be performed during the communication between the first device and the second device through the wired connection.

Persons skilled in the art can understand that, in the foregoing methods of the specific implementation manners of this application, the value of the sequence number of each step does not indicate an execution order, and the execution order of the steps should be determined according to a function and an inherent logic thereof, and should not form any limit to the implementation process of the specific implementation manners of this application.

Moreover, an embodiment of this application further provides a computer readable medium, comprising a computer readable instruction for performing the following operations when being executed: operations of performing the steps of the method in the implementation manner shown in FIG. 1.

An embodiment of this application further provides a computer readable medium, comprising a computer readable instruction for performing the following operations when being executed: operations of performing the steps of the method in the implementation manner shown in FIG. 2.

Figure 3:
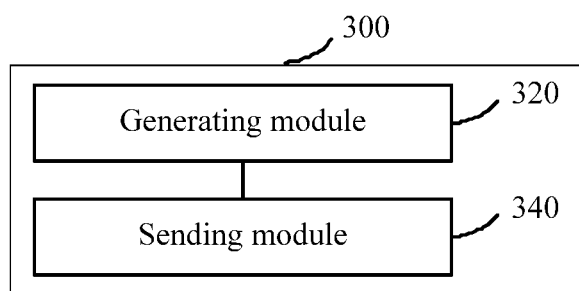
FIG. 3 is an example structural block diagram of a first wireless connection establishing apparatus according to a first embodiment of this application.

This application further provides a wireless connection establishing apparatus. As shown in FIG. 3, FIG. 3 is a structural block diagram of a wireless connection apparatus 300 of an embodiment of this application. The apparatus 300 of the embodiment shown in FIG. 3 may be a wireless connection establishing initiator device, that is, a part of a first device, or an independent apparatus. As shown in FIG. 3, the apparatus 300 comprises: a generating module 320 and a sending module 340.

The generating module 320 is configured to generate connection authentication information according to related information of a wired connection between a first device and a second device.

The related information of the wired connection may be any information involved in a process of communicating through a wired connection, for example, may comprise at least one of the following: identification information of the first device and the second device, a data transmission rate/amount in a preset time point/period, related information of transmitted data (comprising a data type, a data size, and a file name), and a disconnection time of the wired connection.

The sending module 340 is configured to send, in case of disconnection of the wired connection, a wireless connection establishing request in such a manner that the request can be received by the second device, where the request comprises the connection authentication information.

In the apparatus according to this embodiment, the connection authentication information is used to verify legality of one device (the first device) requesting to establish a wireless connection, and in order to ensure connection security, the connection authentication information may be used to serve as a ciphertext in the connection establishing request to be sent in an encryption form, or the connection authentication information directly serves as a key for encrypting some or all content of the request.

In the apparatus according to this embodiment, the connection authentication information is information that only the two devices in the wired connection can know, and therefore, the wireless connection can be established securely and rapidly by using such connection authentication information.

In an example embodiment, in order not to increase device burden, the generating module 320 may generate the connection authentication information in response to the disconnection of the wired connection.

Figure 4:
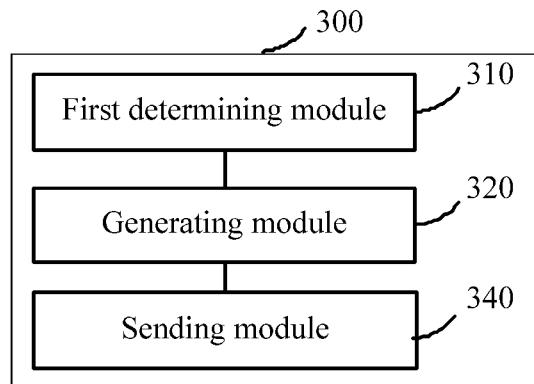
FIG. 4 is an example structural block diagram of a second wireless connection establishing apparatus according to a first embodiment of this application.

Generally, after the wired connection is disconnected, both of the two devices in the wired connection generally will play a role in establishing a wireless connection, that is, after the wired connection is disconnected, each device plays a role of a broadcast party (one party initiating the wireless connection) to broadcast a message that the device may establish the wireless connection, and waits for the wireless connection establishing request; meanwhile or optionally, each device also plays a role of scanning party (one party allowing to be wirelessly connected) at any time to scan the broadcast message of the other device, so as to search for the other device which may establish the wireless connection with the device. In the apparatus according to this embodiment, in order to avoid connection delay caused by randomly determining roles of devices in a wireless connection establishing process and save device energy consumption, as shown in FIG. 4, the apparatus may further comprise:

a first determining module 310, configured to: before the generating module 320 generates the connection authentication information, determine, according to a transmission characteristic of the wired connection, a role of the first device in the process of establishing the wireless connection.

The transmission characteristic of the wired connection may comprise: a signal sending party during communicating through the wired connection, a signal receiving party during communicating through the wired connection, a signal sending party and a signal receiving party during communicating through the wired connection, or, a signal transmission direction before the wired connection is disconnected.

For example, in a process of charging through wired connection, a power supply party is a signal sending party, and a charged device is a signal receiving party.

In a process of performing audio/video playback through a wired connection, a device providing an audio/video source is a signal sending party, and an audio/video output device such as an earphone/display is a signal receiving party.

In a process of performing data packet exchange through a wired connection, at a moment before the wired connection is disconnected, a terminal device sends an access request to an AP, and a data packet transmission direction is from the terminal device to the AP.

Any party in the wired connection mentioned above could be determined as the initiator to establish the wireless connection according to this application. Correspondingly, the sending module 340 may send the wireless connection establishing request only if the wired connection is disconnected and when a role of the first device is an initiator (broadcast party).

Figure 5:
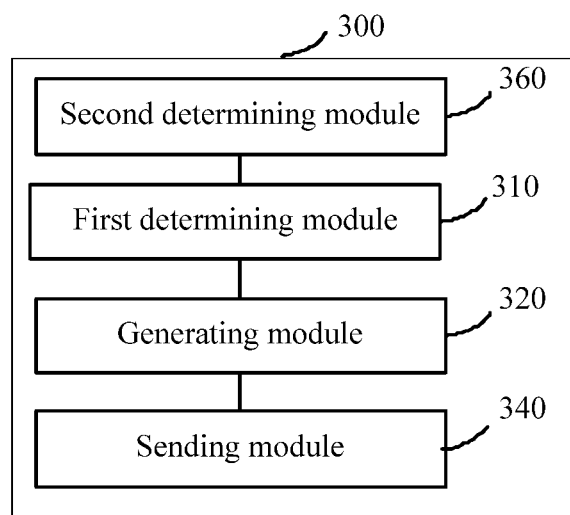
FIG. 5 is an example structural block diagram of a third wireless connection establishing apparatus according to a first embodiment of this application.

Moreover, in order to achieve the objective of this application, the first device and the second device may have agree on a connection authentication way, and the connection authentication way comprises: which related information of the wired connection is used as connection authentication information, an encryption manner of the connection authentication information, and the like. For example, the two parties agree on that, a data transmission amount in five minutes before the disconnection of the wired connection is used as connection authentication information, or time for which the wired connection is disconnected is used as connection authentication information, or time of the wired connection is used as a key for encrypting identification information of the initiator, or the like. Correspondingly, as shown in FIG. 5, the apparatus 300 of this embodiment further comprises:

a second determining module 360, configured to determine a connection authentication way of establishing a wireless connection between the first device and the second device.

Since characteristics of the wired connection such as small interference, large bandwidth, and high privacy security, the second determining module 360 may determine a connection authentication way during the communication between the first device and the second device through the wired connection.

Furthermore, the sending, by the sending module 340, a wireless connection establishing request in such a manner that the request can be received by the second device is preferably implemented in a broadcast way. Moreover, transmit power of the broadcast may be determined according to a communications protocol based on which the communication through the wired connection is. For example, if the wired connection is a connection through USB, and the length of a USB cable cannot exceed 5 m according to standards, and therefore it may be determined that a possible distance between the first device and the second device does not exceed 5 m, in order to save device power consumption, and reduce the quantity of irrelevant devices receiving a broadcast packet, the sending module 340 may broadcast the wireless connection authentication information at a transmit power which can be received by a device within a range of 5 m.

Figure 6:
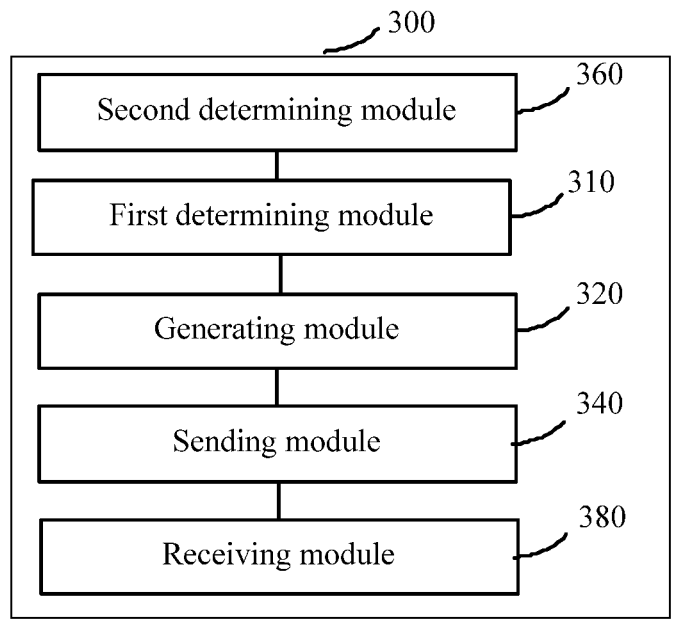
FIG. 6 is an example structural block diagram of a fourth wireless connection establishing apparatus according to a first embodiment of this application.

After the connection authentication information is sent, the second device may receive the connection authentication information and be capable of verify legality of the first device according to the authentication way agreed on establishing a wireless connection with the first device by returning a response. Correspondingly, as shown in FIG. 6, the apparatus 300 of this embodiment further comprises:

a receiving module 380, configured to receive a response of the second device to the wireless connection establishing request, thereby completing establishment of the wireless connection with the second between devices.

To sum up, in the apparatus according to this embodiment, by using related information of a wired connection as authentication information of establishing a wireless connection, the wireless connection can be established rapidly and securely, and device power consumption can also be considered.

Figure 7:
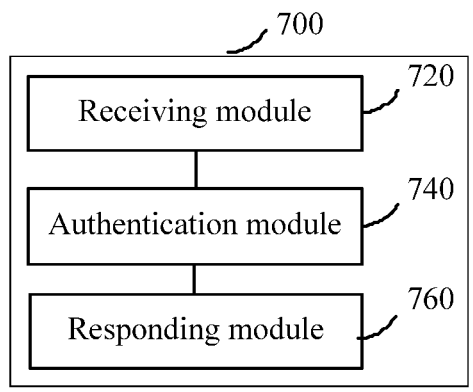
FIG. 7 is an example structural block diagram of a first wireless connection establishing apparatus according to a second embodiment of this application.

This application further correspondingly provides a wireless connection establishing apparatus of another embodiment, all or part of which may belong to the second device in the foregoing embodiments, or which may also be an independent apparatus. As shown in FIG. 7, a wireless connection establishing apparatus 700 of another embodiment of this application comprises: a receiving module 720, an authentication module 740, and a responding module 760.

The receiving module 720 is configured to receive a wireless connection establishing request of a first device.

A second device serving as the other party establishing a wireless connection waits to receive the wireless connection establishing request from the first device after a wired connection between the second device and the first device is disconnected.

The authentication module 740 is configured to verify, in response to that the request comprises connection authentication information, legality of the first device according to related information of a historical wired connection between the first device and a second device.

During waiting for wireless connection establishing request, the second device may receive a connection request sent by more than one requesting party. In response to that the request comprises the connection authentication information used in the method according to this application, the authentication module 740 verifies legality of the requesting party based on related information of a historical wired connection of the requesting party.

The responding module 760 is configured to send a response to the wireless connection establishing request to the first device that is authenticated, thereby establishing a wireless connection between the second device and the legal first device.

The connection authentication information comprises the related information of the historical wired connection between the first device and the second device. The related information of the wired connection may be any information involved in a process of communicating in a wired connection manner, such as, may comprise at least one of the following: identification information of the first device and the second device, a data transmission amount in a preset time point/period, related information of transmitted data (comprising a data type, a data size, and a file name), and a disconnection time of the wired connection.

To sum up, in the apparatus of this embodiment, the connection authentication information is information that only the two devices in the wired connection can know, and therefore, the wireless connection can be established securely and rapidly by using such connection authentication information.

Figure 8:
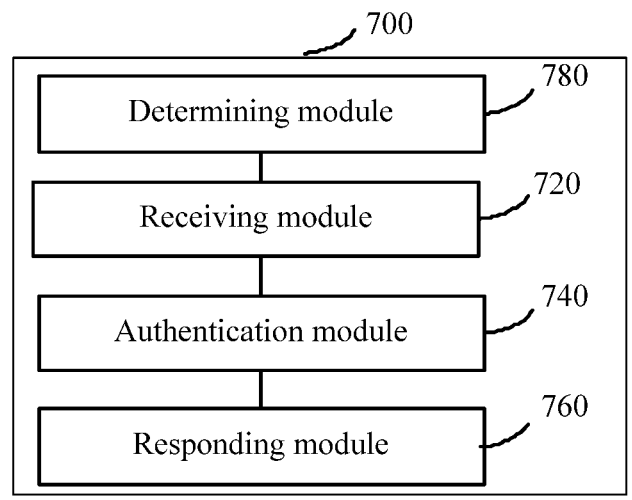
FIG. 8 is an example structural block diagram of a second wireless connection establishing apparatus according to a second embodiment of this application.

Moreover, in order to achieve the objective of this application, the first device and the second device may agree on a connection authentication manner, and the connection authentication manner comprises: which related information of the wired connection is used as connection authentication information, an encryption manner of the connection authentication information, and the like. For example, the two parties agree on that, a data transmission amount in five minutes before the disconnection of the wired connection is used as connection authentication information, or time for which the wired connection is disconnected is used as connection authentication information, or time of the wired connection is used as a key for encrypting identification information of the initiator, or the like. Correspondingly, as shown in FIG. 8, the apparatus 700 according to this embodiment further comprises:

a determining module 780, configured to determine a connection authentication way of establishing a wireless connection between the first device and the second determining module 360 in the apparatus 300 of the previous embodiment.

Since characteristics of the wired connection such as small interference, large bandwidth, and high privacy security, the determining module 780 may communicate with, for example, the second determining module 360 in the apparatus 300 of the previous embodiment in a wired manner in a process that the first device and the second device communicate in a wired connection manner, so as to determine a connection authentication manner.

Figure 9:
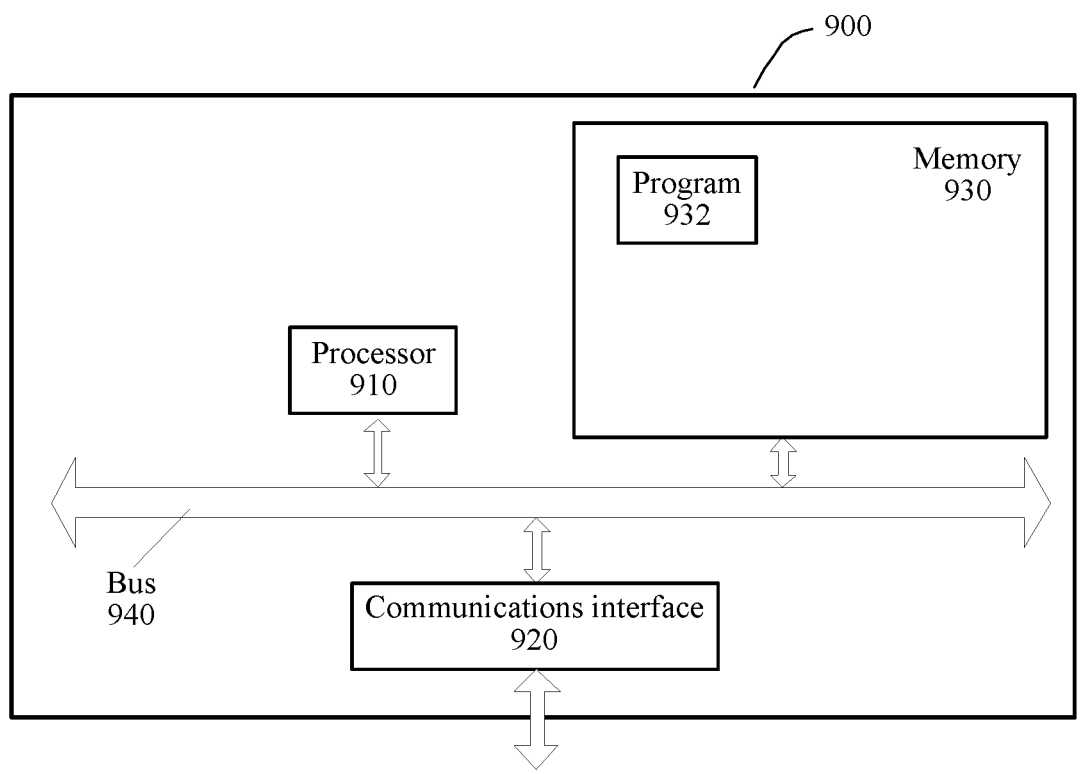
FIG. 9 is an example structural block diagram of a fifth wireless connection establishing apparatus according to a first embodiment of this application.

FIG. 9 is a schematic structural diagram of a wireless connection establishing apparatus 900 provided in an embodiment of this application, and the specific embodiment of this application does not limit implementation of the wireless connection establishing apparatus 900. As shown in FIG. 9, the wireless connection establishing apparatus 900 may comprise:

a processor 910, a communications interface 920, a memory 930, and a communications bus 940.

The processor 910, the communications interface 920, and the memory 930 communicate with each other through the communications bus 940.

The communications interface 920 is configured to communicate with a network element such as a client.

The processor 910 is configured to execute a program 932, which specifically may implement a related function of the wireless connection establishing apparatus in the apparatus embodiment in FIG. 3.

Specifically, the program 932 may comprise program code, where the program code comprises a computer operation instruction.

The processor 910 may be a central processing unit (CPU), or an application specific integrated circuit (ASIC), or one or more integrated circuits that are configured to implement the embodiment of this application. The program 932 specifically may be configured to enable the wireless connection establishing apparatus 900 to perform the following steps:

generating connection authentication information according to related information of a wired connection between a first device and a second device; and sending, in case of disconnection of the wired connection, a wireless connection establishing request in such a manner that the request can be received by the second device, where the request comprises the connection authentication information.

For implementation of steps in the program 932, reference may be made to corresponding description of related steps and units in the foregoing embodiment, which is not described here. It can be clearly understood by persons skilled in the art that, for the purpose of convenient and brief description, as for a specific working process of the foregoing device and module, reference can be made to the corresponding process description in the foregoing method embodiments, and the details are not described herein again.

Figure 10:
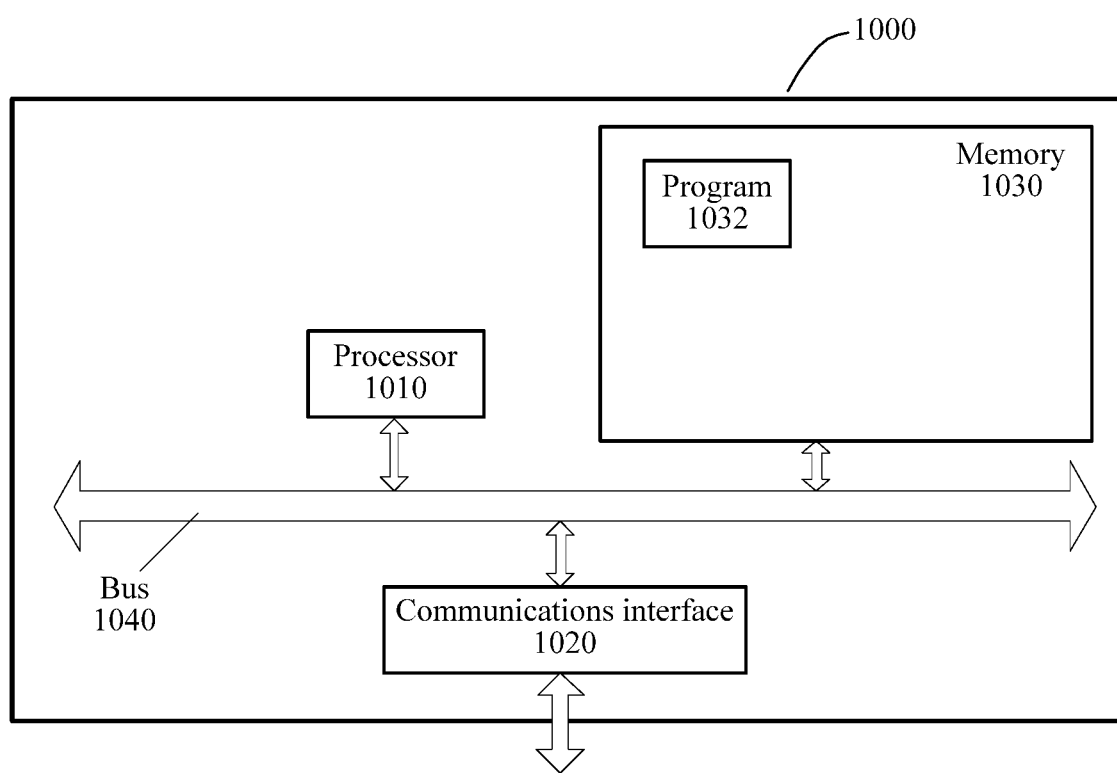
FIG. 10 is an example structural block diagram of a third wireless connection establishing apparatus according to a second embodiment of this application.

FIG. 10 is a schematic structural diagram of a wireless connection establishing apparatus 1000 provided in an embodiment of this application, and the specific embodiment of this application does not limit implementation of the wireless connection establishing apparatus 1000. As shown in FIG. 10, the wireless connection establishing apparatus 1000 may comprise:

a processor 1010, a communications interface 1020, a memory 1030, and a communications bus 1040.

The processor 1010, the communications interface 1020, and the memory 1030 communicate with each other through the communications bus 1040.

The communications interface 1020 is configured to communicate with a network element such as a client.

The processor 1010 is configured to execute a program 1032, which specifically may implement a related function of the wireless connection establishing apparatus in the apparatus embodiment in FIG. 7.

Specifically, the program 1032 may comprise program code, where the program code comprises a computer operation instruction.

The processor 1010 may be a central processing unit (CPU), or an application specific integrated circuit (ASIC), or one or more integrated circuits that are configured to implement the embodiment of this application. The program 1032 specifically may be configured to enable the wireless connection establishing apparatus 1000 to perform the following steps:

receiving a wireless connection establishing request of a first device;

verifying, in response to that the request comprises connection authentication information, legality of the first device according to related information of a historical wired connection between the first device and a second device; and sending a response to the wireless connection establishing request to the first device that is authenticated, where the connection authentication information comprises the related information of the historical wired connection between the first device and the second device.

For implementation of steps in the program 1032, reference may be made to corresponding description of related steps and units in the foregoing embodiment, which is not described here. It can be clearly understood by persons skilled in the art that, for the purpose of convenient and brief description, as for a specific working process of the foregoing device and module, reference can be made to the corresponding process description in the foregoing method embodiments, and the details are not described herein again.

It can be clearly understood by persons skilled in the art that, for the purpose of convenient and brief description, as for a specific working process of the foregoing device and module, reference can be made to the corresponding description in the foregoing apparatus embodiments, and the details are not described herein again.

Although the present invention is described herein the general context of program modules that execute in conjunction with an application program that runs on an operating system on a computer system, a person skilled in the art will recognize that the present invention may also be implemented in combination with other types of program modules. Generally, program modules comprise routines, programs, components, data structures and other types of structures that perform particular tasks or implement particular abstract data types. It can be understood by a person skilled in the art that the present invention described herein may be practiced with other computer system configurations, comprising handheld devices, multiprocessor systems, microprocessor-based or programmable consumer electronics, minicomputers, mainframe computers, and so on, and may also be practiced in distributed computing environments where tasks are performed by remote processing devices linked through a communications network. In a distributed computing environment, program modules may be located in both local and remote memory storage devices.

A person of ordinary skill in the art may be aware that, in combination with the examples described in the embodiments disclosed in this specification, units and method steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the example embodiment goes beyond the scope of this application.

When the functions are implemented in a form of a software functional unit and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and comprises several instructions for instructing a computer device (which may be a personal computer, a server, a network device, and the like) to perform all or a part of the steps of the method described in the embodiment of this application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing information and can be accessed by a computer.

The foregoing example embodiments are merely intended for describing this application rather than limiting this application. A person of ordinary skill in the art should understand that modifications and variations may still be made without departing from the spirit and scope of this application. Therefore, all equivalent technical solutions shall fall within the scope of this application, and the patent protection scope of this application shall be subject to the claims.

What is claimed is:

1. A method, comprising:

generating, in response to a case of disconnection of a wired connection between a first device and a second device, connection authentication information according to related information of the wired connection between the first device and the second device, wherein the connection authentication information is used to verify a legality of the first device requesting to establish a wireless connection, wherein the related information of the wired connection comprises at least one of identification information of the first device and the second device, a data transmission rate or amount in a preset time period, or related information of transmitted data;

sending, in the case of disconnection of the wired connection, a wireless connection establishing request to the second device in a broadcast manner, wherein the wireless connection establishing request comprises the connection authentication information; and determining a transmit power of a broadcast of the wireless connection establishing request according to a communications protocol, wherein the wired connection is based on the communications protocol.

2. The method of claim 1, further comprising:
before the generating of the connection authentication information, determining, according to a transmission characteristic of the wired connection, a role of the first device in establishing a wireless connection according to the wireless connection establishing request.

3. The method of claim 2, wherein the sending the wireless connection establishing request comprises:
sending, in a case of the disconnection of the wired connection and the role of the first device is an initiator, the wireless connection establishing request.

4. The method of claim 3, wherein the transmission characteristic of the wired connection comprises:
one of a signal sending party in communication through the wired connection, a signal receiving party in communication through the wired connection, or a signal transmission direction before the disconnection of the wired connection.

5. The method of claim 1, further comprising:
determining a connection authentication way of establishing a wireless connection between the first device and the second device.

6. The method of claim 5, wherein the determining the connection authentication way comprises:
determining the connection authentication way during communication between the first device and the second device through the wired connection.

7. The method of claim 1, further comprising:
receiving a response of the second device to the wireless connection establishing request.

8. An apparatus, comprising:
a memory that stores executable modules; and
a processor, coupled to the memory, that executes or facilitates execution of the executable modules, comprising:
a generating module configured to generate, in response to a case of disconnection of a wired connection between a first device and a second device, connection authentication information according to related information of the wired connection between the first device and the second device, wherein the connection authentication information is used to verify a legality of the first device requesting to establish a wireless connection, wherein the related information of the wired connection comprises at least one of identification information of the first device and the second device, a data transmission rate or amount in a preset time period, or related information of transmitted data; and
a sending module configured to:
send, in the case of disconnection of the wired connection, a wireless connection establishing request to the second device in a broadcast manner, wherein the wireless connection establishing request comprises the connection authentication information, and
determine the transmit power of the broadcast according to a communications protocol, wherein the wired connection is based on the communications protocol.

9. The apparatus of claim 8, wherein the executable modules further comprise:
a first determining module configured to determine, according to a transmission characteristic of the wired connection, a role of the first device in a process of establishing the wireless connection.

10. The apparatus of claim 9, wherein the sending module is configured to send, in case of the disconnection of the wired connection and the role of the first device is an initiator, the wireless connection establishing request.

11. The apparatus of claim 8, wherein the executable modules further comprise:
a second determining module configured to determine a connection authentication way of establishing a wireless connection between the first device and the second device.

12. The method of claim 11, wherein the second determining module is configured to determine the connection authentication way during communication between the first device and the second device via the wired connection.

13. The apparatus of claim 8, wherein the executable modules further comprise:
a receiving module configured to receive a response of the second device to the wireless connection establishing request.

14. A computer readable storage device, comprising at least one executable instruction, which, in response to execution, causes a system comprising a processor to perform operations, comprising:
generating, in response to a case of disconnection of a wired connection between a first device and a second device, connection authentication information according to related information of the wired connection between the first device and the second device, wherein the connection authentication information is used to verify a legality of the first device requesting to establish a wireless connection, wherein the related information of the wired connection comprises at least one of identification information of the first device and the second device, a data transmission rate or amount in a preset time period, or related information of transmitted data;
sending, in the case of disconnection of the wired connection, a wireless connection establishing request to the second device in a broadcast manner, wherein the wireless connection establishing request comprises the connection authentication information; and
determining a transmit power of a broadcast of the wireless connection establishing request according to a communications protocol, wherein the wired connection is based on the communications protocol.

15. The computer readable storage device of claim 14, further comprising:
before the generating of the connection authentication information, determining, according to a transmission characteristic of the wired connection, a role of the first device in establishing a wireless connection according to the wireless connection establishing request.

16. The computer readable storage device of claim 15, wherein the sending the wireless connection establishing request comprises:
sending, in a case of the disconnection of the wired connection and the role of the first device is an initiator, the wireless connection establishing request.

17. A device, comprising a processor and a memory, wherein the memory stores a executable instructions, the processor is connected with the memory via a communication bus, and when the device is operating, the processor executes or facilitates execution of the executable instructions stored by the memory to cause the device to perform operations, comprising:
generating, in response to a case of disconnection of a wired connection between a first device and a second device, connection authentication information according to related information of the wired connection between the first device and the second device, wherein the connection authentication information is used to verify a legality of the first device requesting to establish a wireless connection, wherein the related information of the wired connection comprises at least one of identification information of the first device and the second device, a data transmission rate or amount in a preset time period, or related information of transmitted data;

sending, in the case of disconnection of the wired connection, a wireless connection establishing request to the second device in a broadcast manner, wherein the wireless connection establishing request comprises the connection authentication information; and determining a transmit power of a broadcast of the wireless connection establishing request according to a communications protocol, wherein the wired connection is based on the communications protocol.

18. The device of claim 17, further comprising:
determining a connection authentication way of establishing a wireless connection between the first device and the second device.

19. A method, comprising:
generating, by a terminal device, in response to a case of disconnection of a wired connection between the terminal device and a network access device, connection authentication information according to related information of the wired connection between the terminal device and the network access device, wherein the connection authentication information is used to verify a legality of the terminal device requesting to establish a wireless connection, wherein the related information of the wired connection comprises at least one of identification information of the terminal device and the network access device, a data transmission rate or amount in a preset time period, or related information of transmitted data; and sending, by the terminal device, in the case of disconnection of the wired connection, a wireless connection establishing request to the network access device in a broadcast manner, wherein the wireless connection establishing request comprises the connection authentication information; and determining, by the terminal device, a transmit power of a broadcast of the wireless connection establishing request according to a communications protocol, wherein the wired connection is based on the communications protocol.

20. The method of claim 19, further comprising:
before the generating of the connection authentication information, determining, by the terminal device, according to a transmission characteristic of the wired connection, a role of the terminal device in establishing a wireless connection according to the wireless connection establishing request.

21. A method, comprising:
generating, by a network access device, in response to a case of disconnection of a wired connection between the network access device and a terminal device, connection authentication information according to related information of a wired connection between the network access device and the terminal device, wherein the connection authentication information is used to verify a legality of the terminal device requesting to establish a wireless connection, wherein the related information of the wired connection comprises at least one of identification information of the network access device and the terminal device, a data transmission rate or amount in a preset time period, or related information of transmitted data; and sending, by the network access device, in the case of disconnection of the wired connection, a wireless connection establishing request to the terminal device in a broadcast manner, wherein the wireless connection establishing request comprises the connection authentication information; and determining, by the network access device, a transmit power of a broadcast of the wireless connection establishing request according to a communications protocol, wherein the wired connection is based on the communications protocol.

22. The method of claim 21, further comprising:
before the generating of the connection authentication information, determining, by the network access device, according to a transmission characteristic of the wired connection, a role of the network access device in establishing a wireless connection according to the wireless connection establishing request.

23. A non-transitory computer-readable medium having instructions stored thereon that, in response to execution, cause a terminal device including a processor to perform operations comprising:
generating, in response to a case of disconnection of a wired connection between the terminal device and a network access device, connection authentication information according to related information of the wired connection between the terminal device and the network access device, wherein the connection authentication information is used to verify a legality of the terminal device requesting to establish a wireless connection, wherein the related information of the wired connection comprises at least one of identification information of the terminal device and the network access device, a data transmission rate or amount in a preset time period, or related information of transmitted data; and sending, in the case of disconnection of the wired connection, a wireless connection establishing request to the network access device in a broadcast manner, wherein the wireless connection establishing request comprises the connection authentication information; and determining a transmit power of a broadcast of the wireless connection establishing request according to a communications protocol, wherein the wired connection is based on the communications protocol.

24. The non-transitory computer-readable medium of claim 23, wherein the operations further comprise:
before the generating of the connection authentication information, determining, according to a transmission characteristic of the wired connection, a role of the terminal device in establishing a wireless connection according to the wireless connection establishing request.

25. A non-transitory computer-readable medium having instructions stored thereon that, in response to execution, cause a network access device including a processor to perform operations comprising:
generating, in response to a case of disconnection of a wired connection between the network access device and a terminal device, connection authentication information according to related information of the wired connection between the network access device and the terminal device, wherein the connection authentication information is used to verify a legality of the terminal device requesting to establish a wireless connection, wherein the related information of the wired connection comprises at least one of identification information of the network access device and the terminal device, a data transmission rate or amount in a preset time period, or related information of transmitted data; and sending, in the case of disconnection of the wired connection, a wireless connection establishing request to the terminal device in a broadcast manner, wherein the wireless connection establishing request comprises the connection authentication information; and determining, by the network access device, a transmit power of a broadcast of the wireless connection establishing request according to a communications protocol, wherein the wired connection is based on the communications protocol.

26. The non-transitory computer-readable medium of claim 25, wherein the operations further comprise:

before the generating of the connection authentication information, determining, according to a transmission characteristic of the wired connection, a role of the network access device in establishing a wireless connection according to the wireless connection establishing request.

27. The non-transitory computer-readable medium of claim 25, wherein the operations further comprise:

determining a connection authentication way of establishing a wireless connection between the network access device and a terminal device.

* * * * *